US011757777B2

(12) United States Patent
Majila et al.

(10) Patent No.: US 11,757,777 B2
(45) Date of Patent: Sep. 12, 2023

(54) ASSIGNING SECURITY GROUP TAG FOR INFRASTRUCTURE TRAFFIC AND PRESERVING SECURITY GROUP TAG IN SNOOPED PACKETS IN DYNAMIC SEGMENTATION

(71) Applicant: Hewlett Packard Enterprise Development LP, Houston, TX (US)

(72) Inventors: Rajib Majila, Bangalore (IN); Ram Iakhan Patel, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/483,474

(22) Filed: Sep. 23, 2021

(65) Prior Publication Data

US 2023/0093278 A1    Mar. 23, 2023

(51) Int. Cl.
| | | |
|---|---|---|
| *H04L 45/745* | (2022.01) | |
| *H04L 45/02* | (2022.01) | |
| *H04L 12/46* | (2006.01) | |
| *H04L 45/42* | (2022.01) | |
| *H04L 101/622* | (2022.01) | |

(52) U.S. Cl.
CPC ........ *H04L 45/745* (2013.01); *H04L 12/4641* (2013.01); *H04L 45/02* (2013.01); *H04L 45/42* (2013.01); *H04L 2101/622* (2022.05)

(58) Field of Classification Search
CPC ... H04L 45/745; H04L 12/4641; H04L 45/02; H04L 45/42; H04L 2101/622
See application file for complete search history.

(56) References Cited

U.S. PATENT DOCUMENTS

| | | | | |
|---|---|---|---|---|
| 2004/0054655 | A1* | 3/2004 | Brown | ............... H04L 12/4625 |
| 2006/0002386 | A1* | 1/2006 | Yik | ..................... H04L 49/3063 |
| | | | | 370/469 |
| 2009/0307751 | A1* | 12/2009 | Lin | ...................... H04L 63/162 |
| | | | | 709/245 |

(Continued)

OTHER PUBLICATIONS

Joe Onisick, "VXLAN Deep Dive—Part II", available online at <https://web.archive.org/web/20210412201504/http://www.definethecloud.net/vxlan-deep-divepart-2/>, Nov. 13, 2012, 10 pages.

(Continued)

*Primary Examiner* — William G Trost, IV
*Assistant Examiner* — Monishwar Mohan
(74) *Attorney, Agent, or Firm* — Park, Vaughan, Fleming & Dowler LLP

(57) ABSTRACT

The system determines a first source MAC associated with a switch. The system updates a MAC address table by mapping the first source MAC to a first tag which indicates a source role corresponding to a network infrastructure. A processor associated with the switch generates a first packet which indicates the first source MAC. The system performs a first search in the MAC address table based on the indicated first source MAC to obtain the first tag, and performs a second search in a policy table based on the first tag for a policy which indicates an action to be applied to the first packet. If the second search is not successful, the system modifies a header of the first packet by adding the first tag. If the second search is successful, the system determines that the indicated action comprises allowing the first packet and transmits the first packet.

17 Claims, 8 Drawing Sheets

(56) References Cited

U.S. PATENT DOCUMENTS

2017/0078330 A1* 3/2017 Sreeramoju ......... H04L 63/0435
2020/0067808 A1* 2/2020 Nandy .................... H04L 43/20

OTHER PUBLICATIONS

Joe Onisick, "VXLAN Deep Dive", available online at <https://web.archive.org/web/20210412193454/http://www.definethecloud.net/vxlan-deep-dive/>.Nov. 13, 2012, 7 pages.
Wikipedia, "Virtual Extensible LAN", available online at <https://en.wikipedia.org/w/index.php?title=Virtual_Extensible_LAN&oldid=1034546984>, Jul. 20, 2021, 2 pages.

* cited by examiner

ASSIGNING SECURITY GROUP TAG FOR INFRASTRUCTURE TRAFFIC AND PRESERVING SECURITY GROUP TAG IN SNOOPED PACKETS IN DYNAMIC SEGMENTATION

BACKGROUND

Field

This disclosure is generally related to the field of data management. More specifically, this disclosure is related to a method and system which facilitates assigning a security group tag for infrastructure traffic and preserving the security group tag in snooped packets in dynamic segmentation.

BRIEF DESCRIPTION OF THE FIGURES

In the figures, like reference numerals refer to the same figure elements.

DETAILED DESCRIPTION

Figure 1:
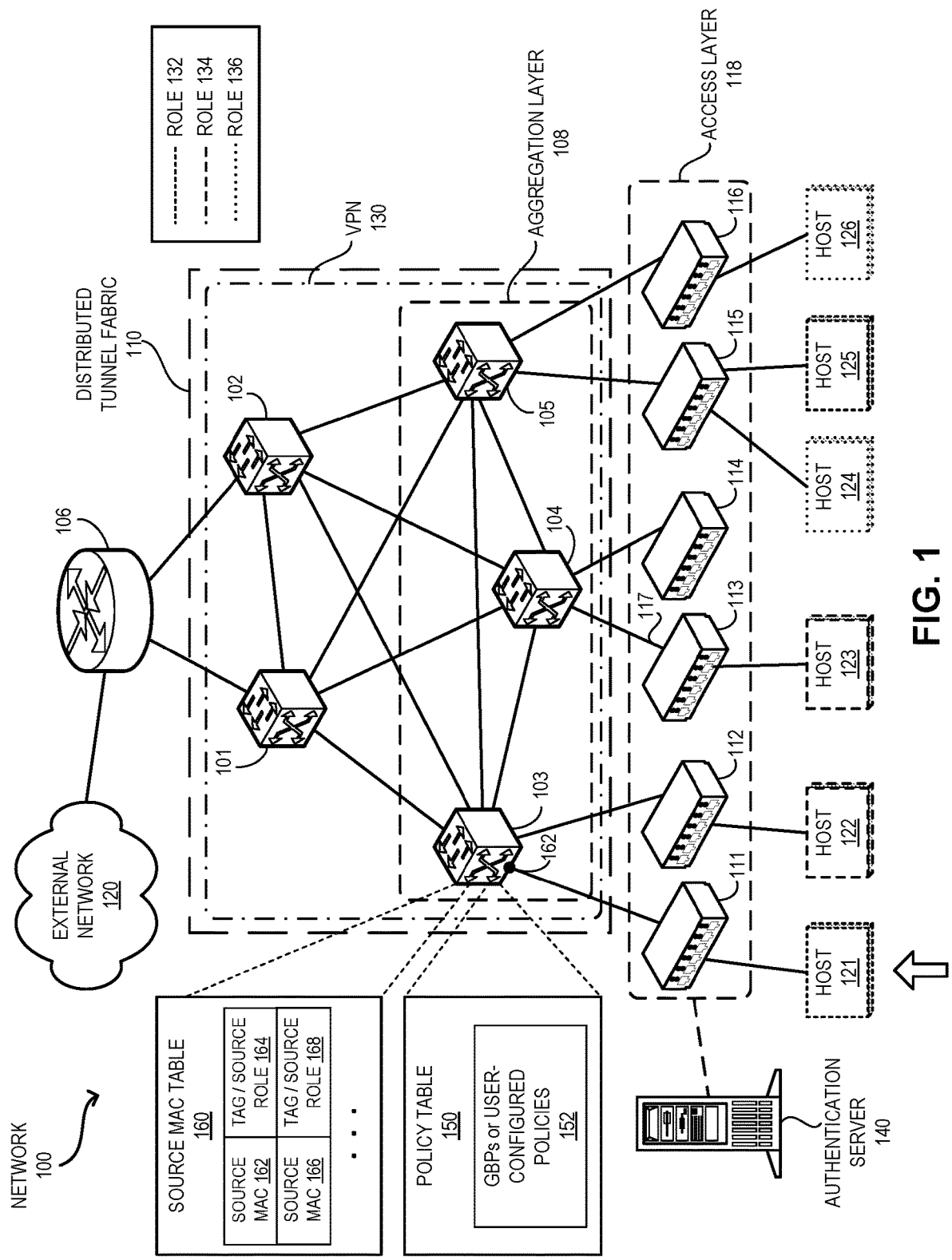
FIG. 1 illustrates a network which facilitates policy enforcement based on source roles, in accordance with an aspect of the present application.

The following description is presented to enable any person skilled in the art to make and use the aspects and examples, and is provided in the context of a particular application and its requirements. Various modifications to the disclosed aspects will be readily apparent to those skilled in the art, and the general principles defined herein may be applied to other aspects and applications without departing from the spirit and scope of the present disclosure. Thus, the aspects described herein are not limited to the aspects shown, but are to be accorded the widest scope consistent with the principles and features disclosed herein.

Internet is the delivery medium for a variety of applications running on physical and virtual devices. These applications bring with them an increasing traffic demand. As a result, equipment vendors continue to be build switches with versatile capabilities. For example, network segmentation can be used to isolate user traffic and reduce the broadcast domain in a network. Traditionally, virtual local area networks (VLANs) have been used to segment network traffic at L2, and IP sub-domains have been used to segment network traffic at L3. Traditional network segmentation at the edge can face some challenges, such as: the integration of traditional wire and wireless infrastructures; the ever-increasing number of mobile devices in a network; and the deployment of Internet-of-Things (IoT) devices in large numbers. Furthermore, in scaling a network, it may be challenging to support a large mix of devices with different levels of access requirements and threat perception as well as traditional manual and static configurations using internet protocol (IP)-subnets an access control lists (ACLs).

Group-based policies (GBPs) can provide a solution for dynamic network segmentation. GBPs can allow a network administrator to configure policies which define permissible traffic patterns across or within user roles. A GBP can be configured as a policy between a pair of source and destination roles, and can help in both micro-segmentation (in the same subnet) and macro-segmentation (across different subnets). The system can profile the sender of a packet at the ingress node and carry the profiling information using a transport encapsulation. This information can be encoded using an identifier, which can be referred to a "GBP tag" or a "group security tag." Traffic from a client which is not on a secure port (or which fails an authentication process) may be given a default tag. In order to control access to secure network resources, the system can use a more restrictive policy to define access privileges for packets which include the default tag.

However, the control plane of a switch (e.g., via a processor or central processing unit (CPU)) may generate network infrastructure packets, and the delivery of these packets may be important to the proper functioning of the network or for troubleshooting. Because these packets do not have a source role associated with them, it may be challenging to differentiate these network infrastructure packets from packets arriving from clients on non-secured ports. The described aspects solve this problem by using a reserved tag which identifies the packet as an infrastructure packet (e.g., associated with a particular source role). A network administrator or the system can configure a corresponding policy for the reserved tag (or particular source role), which policy can provide the necessary or requisite level of access privileges to the network infrastructure packets. These network infrastructure packets may also be referred to as "CPU-generated packets." An example of creating and using the reserved tag in CPU-generated packets is described below in relation to FIG. 3.

A similar problem may exist for packets which are snooped (e.g., copied to the CPU and dropped) by a security protocol. When the system copies these snooped packets to the CPU, these packets may lose their tag. If the CPU subsequently reforwards these packets, the system can treat these reforwarded packets as coming from a non-secure port, and thus may assign the restrictive default tag to these packets. This may result in the system treating the packet in a different manner than originally intended (i.e., as based on the role of the sender or the source role). The described aspects solve this problem by preserving the tags for such packets, which can also be referred to as "CPU-reforwarded packets." An example of preserving tags in CPU-reforwarded packets is described below in relation to FIGS. 4A and 4B.

Thus, the described aspects provide a method and system for creating and using a reserved tag in CPU-generated packets and for preserving tags in CPU-reforwarded packets, which allows the system to use GBP for dynamic segmentation of network traffic.

In this disclosure, the term "switch" is used in a generic sense, and it can refer to any standalone or fabric switch operating in any network layer. "Switch" should not be interpreted as limiting aspects of the present invention to layer-2 networks. Any device that can forward traffic to an external device or another switch can be referred to as a "switch." Any physical or virtual device (e.g., a virtual machine or switch operating on a computing device) that can forward traffic to an end device can be referred to as a "switch." Examples of a "switch" include, but are not limited to, a layer-2 switch, a layer-3 router, a routing switch, a component of a Gen-Z network, or a fabric switch comprising a plurality of similar or heterogeneous smaller physical and/or virtual switches.

The term "packet" refers to a group of bits that can be transported together across a network. "Packet" should not be interpreted as limiting aspects of the present invention to layer-3 networks. "Packet" can be replaced by other terminologies referring to a group of bits, such as "message," "frame," "cell," "datagram," or "transaction." Furthermore, the term "port" can refer to the port that can receive or transmit data. "Port" can also refer to the hardware, software, and/or firmware logic that can facilitate the operations of that port.

Policy Enforcement in an Overlay Topology

A switch may support different protocols and services. For example, the switch can support tunneling and virtual private networks (VPNs). The switch can then facilitate overlay routing for a VPN over the tunnels. For example, an Ethernet VPN (EVPN) can be deployed as an overlay over a set of virtual extensible local area networks (VXLANs).

To deploy a VPN over the tunnels, a respective tunnel endpoint may map a respective client virtual local area network (VLAN) to a corresponding tunnel network identifier (TNI), which can identify a virtual network for a tunnel. The TNI may appear in a tunnel header that encapsulates a packet and is used for forwarding the encapsulated packet via a tunnel. For example, if the tunnel is formed based on VXLAN, the TNI can be a virtual network identifier (VNI) of a VXLAN header, and a tunnel endpoint can be a VXLAN tunnel endpoint (VTEP). A TNI can also be mapped to the virtual routing and forwarding (VRF) associated with the tunnels if the layer-3 routing and forwarding are needed.

The VPN can be deployed over tunnels formed among the backbone (or non-access) switches of a network. For example, if a network includes core, aggregation, and access switches, the core and aggregation switches of the network can be referred to as the backbone switches. The set of tunnels among the backbone switches can form an overlay tunnel fabric. In other words, the backbone switches of the tunnel fabric can operate as the tunnel endpoints and facilitate routing over the tunnels. On the other hand, the access switches can receive the packets from hosts (or client devices) and facilitate the packet distribution underlay. Since a VPN can be distributed across the tunnel fabric, a VPN over the tunnel fabric can also be referred to as a distributed tunnel fabric.

FIG. 1 illustrates a network 100 which facilitates policy enforcement based on source roles, in accordance with an aspect of the present application. A network 100 can include a number of switches and devices. Network 100 can be an Ethernet, InfiniBand, or other networks, and may use a corresponding communication protocol, such as Internet Protocol (IP), FibreChannel over Ethernet (FCoE), or other protocol. Network 100 can include a distributed tunnel fabric 110 comprising switches 101, 102, 103, 104, and 105. Switches 101 and 102 of fabric 110 can be coupled to a core switch 106. Fabric 110 can be coupled to an external network 120 via switch 106 (e.g., a layer-3 router).

A switch in fabric 110 can include both a policy table (which stores GBPs or user-configured policies 152 for how to handle a particular packet) and a source MAC address table. For example, switch 103 can include a policy table 150 which stores GBPs or user-configured policies 152 (where each policy can be defined based on a pair of a source role and a destination role) and a source MAC address table 160. As described above, some packets may not have an associated source role (e.g., CPU-generated packets) and some packets may lose their assigned tag (or source role) information (e.g., CPU-reforwarded packets). In the case of CPU-generated packets, switch 103 can update source MAC address table 160 by mapping a source MAC (e.g., 162) associated with switch 103 to a predetermined tag (e.g., 164) which indicates a source role corresponding to a network infrastructure associated with switch 103, as described below in relation to FIG. 3. In the case of CPU-reforwarded packets, switch 103 can retrieve, from the headers of a given packet, a tag which indicates a source role corresponding to the packet sender and a source MAC address associated with a sender of the packet. Switch 103 can then update source MAC address table 160 by mapping the retrieved source MAC (e.g., 166) to the retrieved source role (e.g., 168), as described below in relation to FIGS. 4A and 4B.

In FIG. 1, a respective link in fabric 110 can be a tunnel. Switches of fabric 110 may form a mesh of tunnels. Examples of a tunnel include, but are not limited to, VXLAN, Generic Routing Encapsulation (GRE), Network Virtualization using GRE (NVGRE), Generic Networking Virtualization Encapsulation (Geneve), Internet Protocol Security (IPsec). A VPN 130, such as an EVPN, can be deployed over fabric 110. Fabric 110 can include an aggregation layer 108, which can include aggregate switches 103, 104, and 105. A respective aggregate switch can aggregate traffic from one or more downstream access switches.

Furthermore, aggregate switches 103, 104, and 105 can be coupled to an access layer 118, which can include access switches 111, 112, 113, 114, 115, and 116. Access layer 118 can facilitate access to fabric 110 to a number hosts 122, 123, 124, 125, and 126. Examples of hosts can include, but are not limited to, laptops, desktops, printers, cellphones, tablets, IoT devices, and appliances. Access switch 115 can provide access coverage to hosts 124 and 125. Similarly, access switches 111, 112, 113, and 116 can provide access coverage to hosts 121, 122, 123, and 126, respectively. In this example, access switches 113 and 114 can be coupled to aggregate switch 104 to forward traffic to fabric 110. Consequently, the packets forwarded by access switch 113 can enter fabric 110 via aggregate switch 104.

With existing technologies, when host 123 joins the coverage of access switch 113, access switch 113 can authenticate host 123 from an authentication server 140. The authentication of host 123 can be based on an authentication process supported by access layer 118. For example, the authentication process can be based on a port-based (e.g., IEEE 802.1X) or username/password-based authentication. If host 123 is successfully authenticated by authentication server 140, access switch 113 can determine a host role 134 of host 123 and allocate a VLAN to host 123 based on the host role. Host role 134 may be provided by authentication server 140 and can indicate the affiliation between a user of host 123 and the entity associated with VPN 130. Host role 134 can indicate one or more of: a department of the user of host 123; a level of access granted to the user; and a domain of communication for host 123.

For example, if host 123 is associated with a user with administrative privilege, role 134 can be an administrator role. On the other hand, if host 123 is associated with a guest user, role 134 can be a guest role. In the same way, corresponding access switches of access layer 118 can determine role 132 for hosts 121 and 125, role 134 for host 122, and role 136 for hosts 124 and 126. The roles can thus define policies for accessing and forwarding traffic in fabric 110 instead of the physical location of the hosts or switches. By associating host 123 to role 134, host 123 can be allocated to a group of hosts belonging to role 134. A host may be associated with one or more groups. A user (e.g., an administrator) can then configure GBPs for fabric 110 to facilitate segmentation of traffic based on roles 132, 134, and 136 as determined during the authentication process. The GBPs thus allow the administrator to configure policies that define permissible traffic patterns across roles 132, 134, and 136 in fabric 110.

In fabric 110, the GBPs can be deployed at the egress switches without distributing them across fabric 110. For example, for packets received via tunnels, switch 103 can operate as a policy-enforcement switch and maintain a policy table 150 comprising a set of policies (e.g., GBPs or user-configured policies) 152 defined based on the source and destination roles. A respective policy or GBP in policies 152 can indicate whether a class of traffic (e.g., with certain traffic attributes) from a source role is allowed or permitted to be forwarded to a destination role. For example, a GBP can indicate whether role 134 is permitted to receive Transmission Control Protocol (TCP) traffic from role 132 at port 80. Since switch 103 can act as an egress switch for a packet received via a tunnel, switch 103 can determine the destination role for the packet. Furthermore, switch 103 may only enable a policy associated with a role if a host with that role is detected at a port of switch 103. In this way, switch 103 can efficiently enforce GBPs in fabric 110.

In another example, upon successful authentication of host 125, host 125 can send a packet to host 122. Access switch 115 can receive the packet and forward it to fabric 110. Ingress switch 105 can receive the packet and determine the source role (i.e., role 132 of source host 125) associated with the packet. Switch 105 can also determine a TNI (e.g., a VNI) corresponding to the VLAN of the packet. Switch 105 can further determine a remote tunnel endpoint, such as switch 103, in fabric 110 based on the header information of the packet. Switch 105 can maintain a mapping between the VLAN and the TNI for determining the TNI. Switch 105 can then encapsulate the packet (e.g., with a group policy object (GPO) encapsulation) with a tunnel header with the TNI, a destination address corresponding to switch 103, and the source role. Subsequently, switch 105 can forward the encapsulated packet via the tunnel to switch 103. To identify switch 103 as the remote tunnel endpoint, switch 105 needs to participate in the routing process of VPN 130 based on the TNI. The participation can include sharing of routing information associated with the TNI with the rest of fabric 110, including updating a media access control (MAC) address table.

Egress switch 103, which can be the other tunnel endpoint of the tunnel, can obtain the source role from the tunnel header and decapsulate the tunnel header to obtain the packet. Based on the destination address of the packet, switch 103 can determine the destination role (i.e., role 134 of destination host 122). Switch 103 can traverse policies 152 to determine whether the traffic class of the packet is permitted to be forwarded from role 132 to role 134. If permitted, switch 103 can forward the packet to host 122. Otherwise, switch 103 can refrain from forwarding the packet to host 122 and may drop the packet. Thus, the network described in FIG. 1 depicts how segmentation using GBP requires an associated role for the sender (i.e., a source role) as well as the destination of every packet (i.e., a destination role).

Figure 2A:
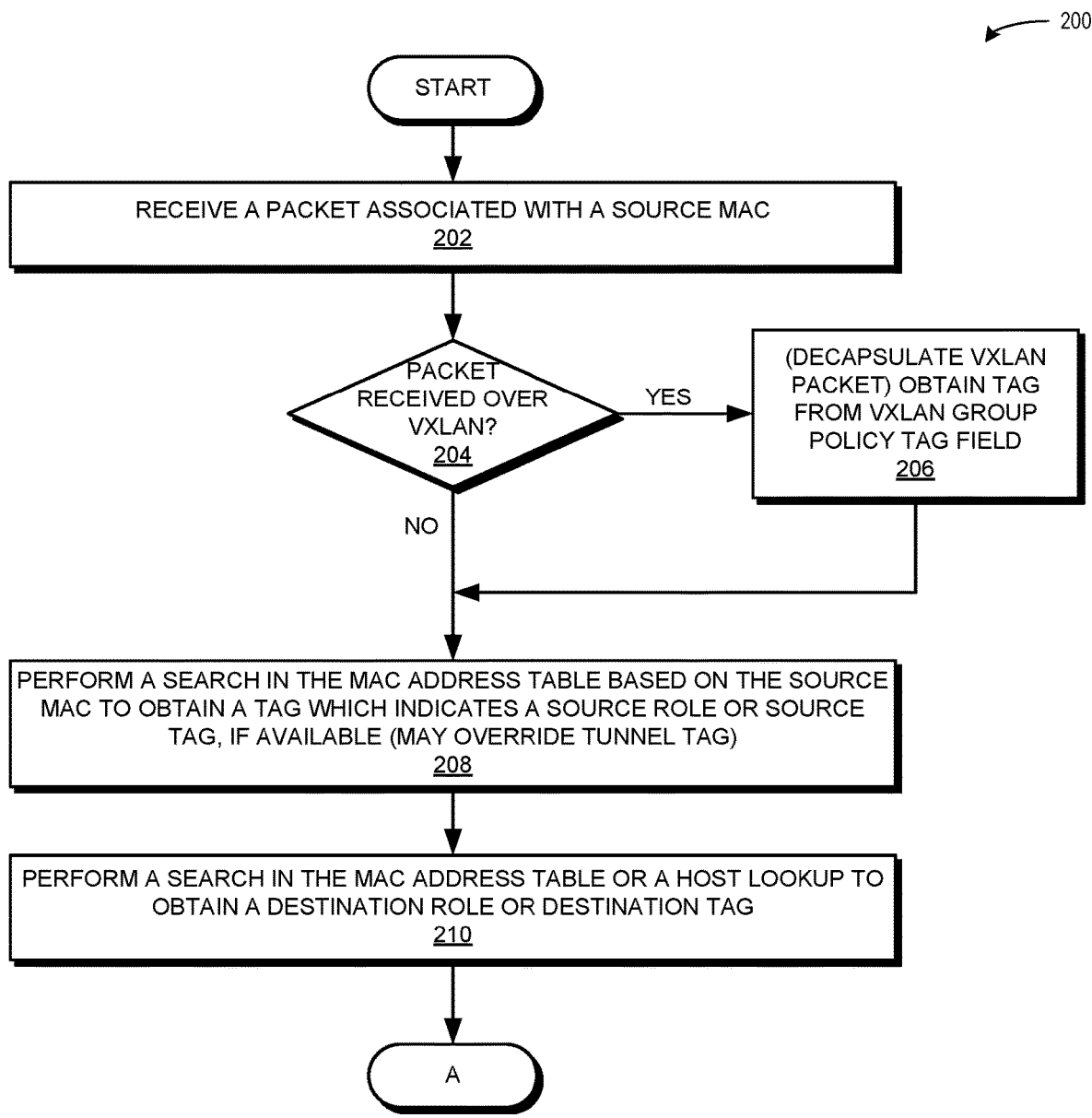
FIG. 2A presents a flowchart illustrating a method which depicts encapsulation using an appropriate tag, in accordance with the prior art.
Figure 2B:
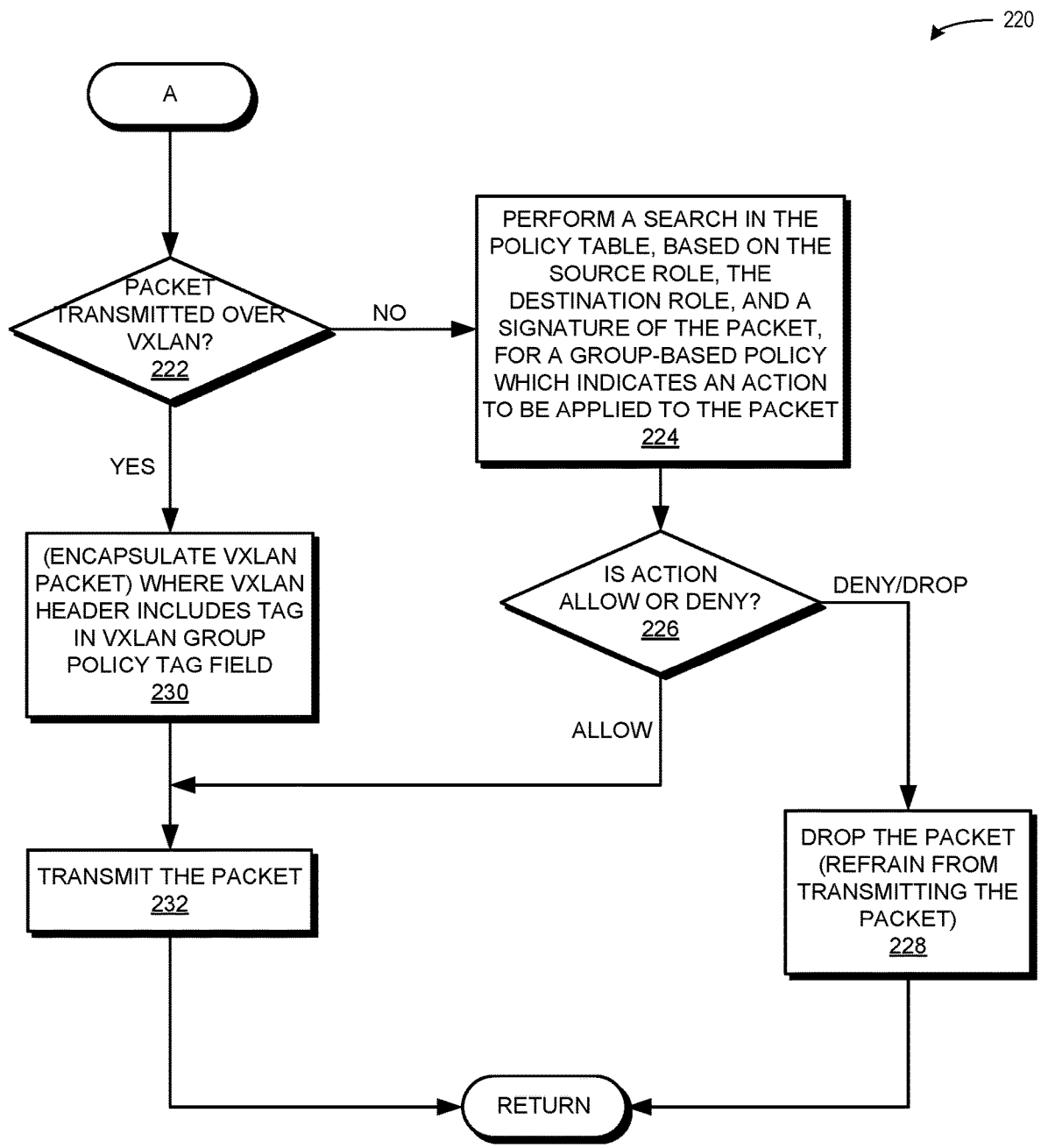
FIG. 2B presents a flowchart illustrating a method which depicts encapsulation using an appropriate tag, in accordance with the prior art.

As described above in relation to FIG. 1, a packet can arrive over an access port. Based on the available role information in the source MAC table (or a common MAC address table), the system can identify the source role which is subsequently used for GPO encapsulation. Because the local switch has authorized the client, the local switch knows the role of the client (source role), and can program the source role in the source MAC table (or the MAC address table) while creating the entry via the learn process. The packet can also arrive over VXLAN, in which case the system can use the GPO tag received in the header of the VXLAN packet as the source role or security tag. In some aspects, this GPO tag may be overridden via a lookup in the source MAC table, but this does not usually occur because the sender of the packet is remote to the switch and thus the source role may not be available in the source MAC tables used by the switch. FIGS. 2A and 2B below depict these communications.

FIG. 2A presents a flowchart 200 illustrating a method which depicts encapsulation using an appropriate tag, in accordance with the prior art. During operation, the system receives a packet associated with a source MAC (operation 202). If the packet is received over a VXLAN (decision 204), the system decapsulates the VXLAN packet and obtains a tag from the VXLAN group policy tag field (e.g., the GPO tag or the security tag) (operation 206), and the operation continues at operation 208. If the packet is not received over a VXLAN (i.e., is a locally switched/routed packet) (decision 204), the system performs a search in the MAC address table based on the source MAC to obtain a tag which indicates a source role or a source tag, if available (which may override the tunnel tag if obtained from operation 206) (operation 208). The system performs a search in the MAC address table or a host lookup to obtain a destination role or a destination tag (operation 210). In some aspects, the MAC address table is a common table which stores both source and destination information, while in other aspects, separate tables are used to store information for the source and destination information. The operation continues at Label A of FIG. 2B.

FIG. 2B presents a flowchart 220 illustrating a method which depicts encapsulation using an appropriate tag, in accordance with the prior art. If the packet is transmitted over a VXLAN (decision 222), the system encapsulates the VXLAN packet where the VXLAN header includes the tag in the VXLAN group policy tag field (operation 230) and transmits the packet (operation 232). The VXLAN group policy tag field can be part of one encapsulation header of a plurality of encapsulation headers of a VXLAN packet. For example, a VXLAN packet can include: an L2 encapsulation header; an L3 encapsulation header; an L4 encapsulation header; an L5 encapsulation header; and a payload. The L5 encapsulation header can include: flags (comprised of 8 bits); the group policy tag (comprised of 24 bits); a VXLAN network identifier (VNI) (comprised of 24 bits); and a reserved field (comprised of 8 bits). The system can use other available encapsulations, such as a VXLAN generic protocol extension (GPE) encapsulation.

If the packet is not transmitted over a VXLAN (decision 222), the system performs a search in the policy table, based on the source role, the destination role, and a signature of the packet, for a group-based policy which indicates an action to be applied to the packet (operation 224). The action can indicate whether to allow the packet or to deny/drop the packet. If the action indicates to allow the packet (decision 226), the system transmits the packet (operation 232). If the action indicates to deny/drop the packet (decision 226), the system drops the packet (refrains from transmitting the packet) (operation 228). The operation returns.

Handling CPU-Generated Packets and CPU-Reforwarded Packets

FIGS. 2A and 2B depict a packet arriving over an access port. As described above, a packet can also arrive from the CPU, as a CPU-generated packet or a CPU-reforwarded packet. A CPU-generated packet can include a MAC which is either the system MAC of the switch or, in some aspects, a virtual MAC of the switch. Because these MAC addresses are station MAC addresses, these MAC addresses are not learnt and are not present in the source MAC table (or the MAC address table). As a result, these packets can yield a miss result in the source MAC table, and can instead be tagged with a default tag (e.g., a more restrictive tag). A CPU-reforwarded packet may be a snooped packet, which is copied to the CPU, examined, and then dropped or reforwarded. If such a packet arrives over a VXLAN tunnel and is snooped, the system can decapsulate the packet and send it to a control plane daemon for processing. Since the sender of this packet is a non-local client (as received over the VXLAN tunnel) and was not locally authenticated (by the local switch), the local switch may not know the source role information of the sender of this packet. As a result, these packets will similarly be tagged with the default tag. In both of these cases (CPU-generated and CPU-reforwarded packets), the default tag does not accurately reflect the true status or permission level of the packet.

The system can generally implement the fast path logic described above in FIGS. 2A and 2B in an application specific integrated circuit (ASIC) to address these problems. However, modifications may be both difficult and costly. Thus, while it is possible to solve these problem using transaction data (e.g., ASIC preserves metadata in source data and applies metadata by swapping metadata with received metadata), this metadata-based approach can be constrained by requiring the appropriate ASIC support. Without this ASIC support, it may be difficult to encapsulate CPU-generated and CPU-reforwarded packets with the appropriate GBP or GPO tag.

Figure 3:
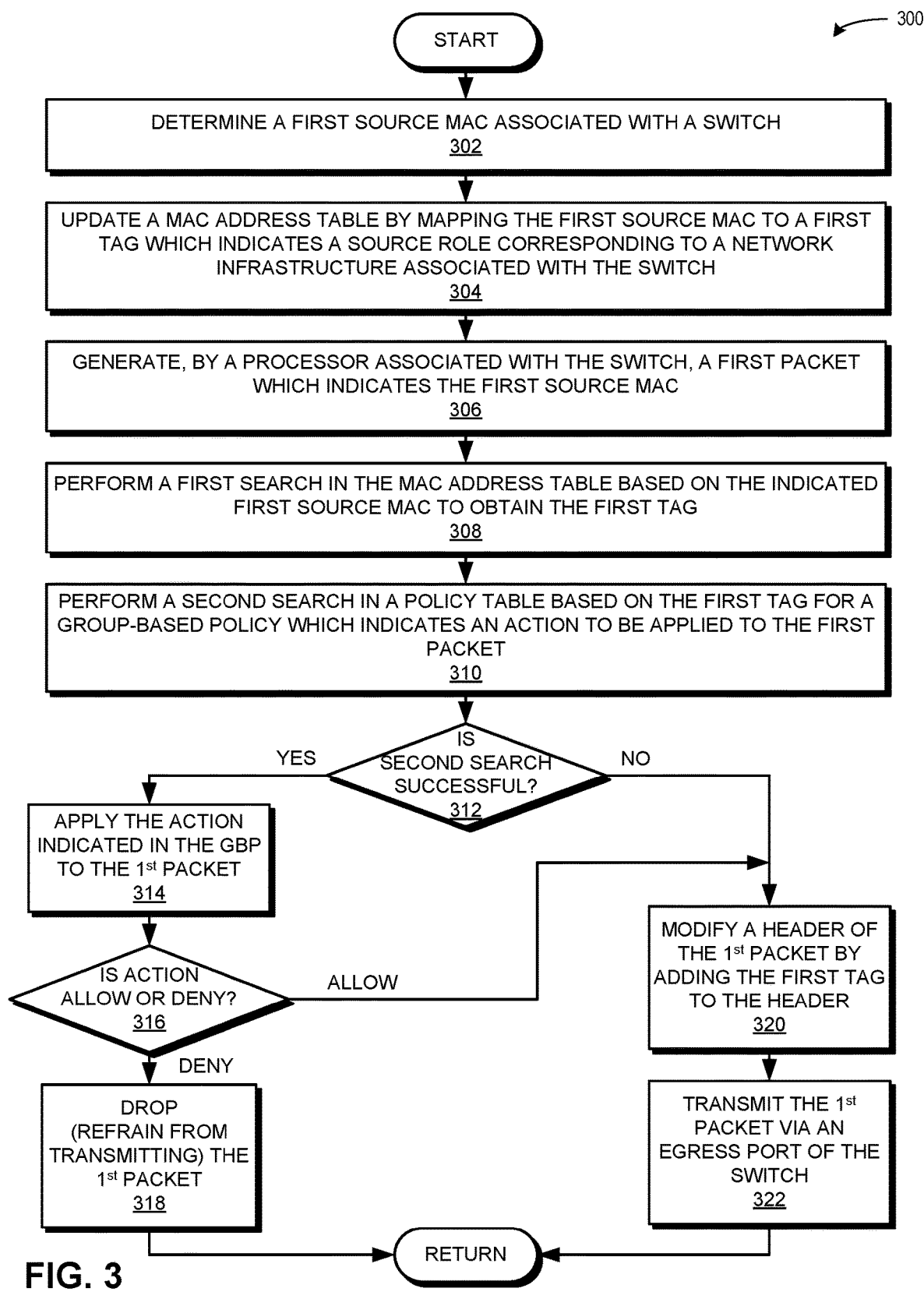
FIG. 3 presents a flowchart illustrating a method which facilitates handling of a CPU-generated packet, in accordance with an aspect of the present application.

The described aspects solve this problem as described below in relation to FIGS. 3, 4A, and 4B. FIG. 3 presents a flowchart 300 illustrating a method which facilitates handling of a CPU-generated packet, in accordance with an aspect of the present application. During operation, the system determines a first source media access control address (MAC) associated with a switch (operation 302). The system updates a MAC address table by mapping the first source MAC to a first tag which indicates a source role corresponding to a network infrastructure associated with the switch (operation 304). The system generates, by a processor associated with the switch, a first packet which indicates the first source MAC (operation 306). The system performs a first search in the MAC address table based on the indicated first source MAC to obtain the first tag (operation 308). The system performs a second search in a policy table based on the first tag for a group-based policy which indicates an action to be applied to the first packet (operation 310). Responsive to determining that the second search is not successful (decision 312), the system modifies a header of the first packet by adding the first tag to the header (operation 320) and transmits the first packet via an egress port of the switch (operation 322). The operation returns.

Responsive to determining that the second search is successful (decision 312), the system applies the action indicated in the GBP to the first packet (operation 314). If the action indicates to allow the first packet (decision 316), the system modifies a header of the first packet by adding the first tag to the header (operation 320) and transmits the first packet via an egress port of the switch (operation 322), and the operation returns. If the action indicates to deny the first packet (decision 316), the system drops the first packet (e.g., refrains from transmitting the first packet) (operation 318), and the operation returns.

Figure 4A:
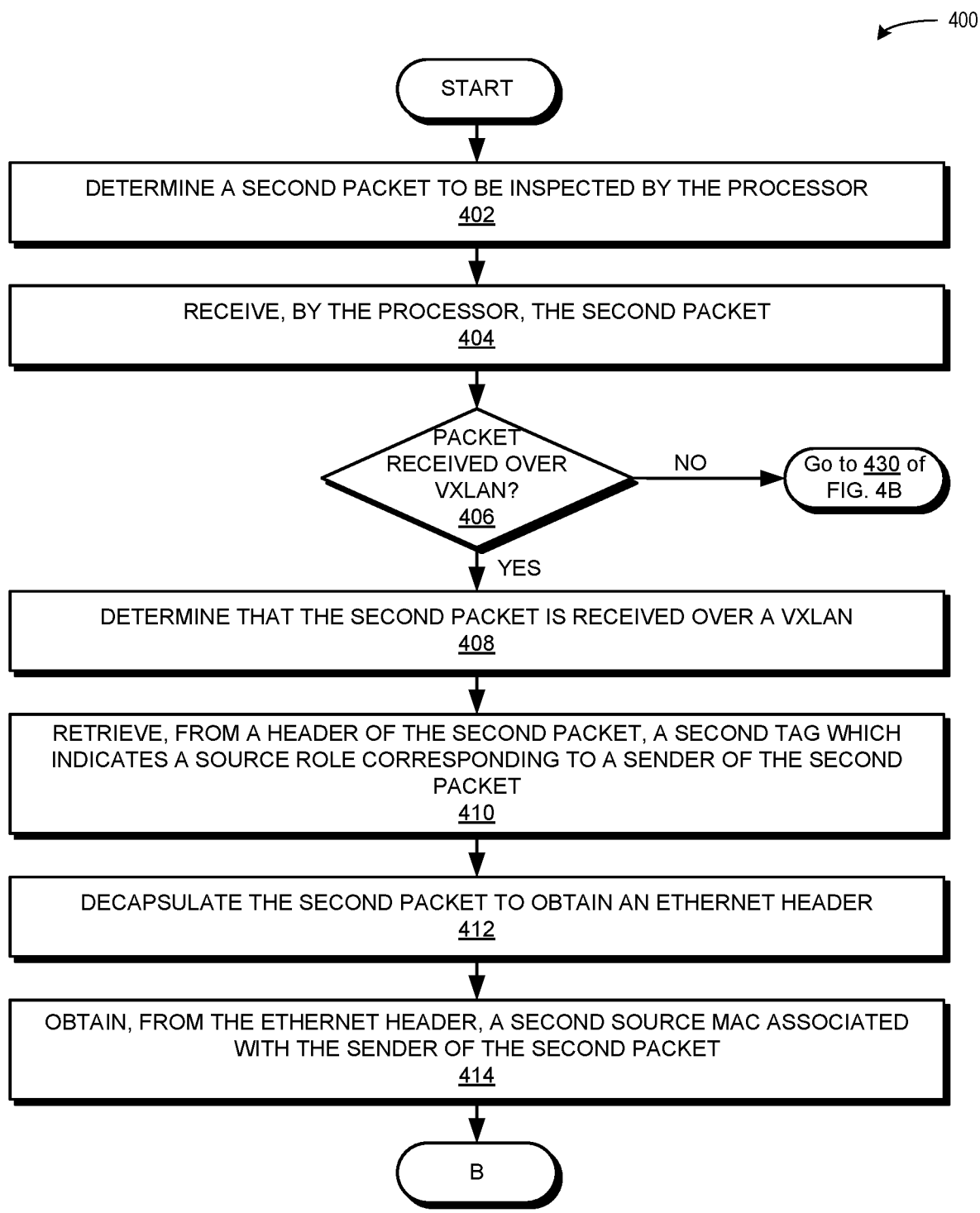
FIG. 4A presents a flowchart illustrating a method which facilitates handling of a CPU-reforwarded packet, in accordance with an aspect of the present application.

FIG. 4A presents a flowchart 400 illustrating a method which facilitates handling of a CPU-reforwarded packet, in accordance with an aspect of the present application. During operation, the system determines a second packet to be inspected by the processor (operation 402). The system receives, by the processor, the second packet (operation 404). If the second packet is not received over a virtual extensible local area network (VXLAN) (decision 406), the operation continues at operation 432 of FIG. 4B.

If the second packet is received over a VXLAN (decision 406), the system determines that the packet is received over a VXLAN (operation 408) and retrieves, from a header of the second packet, a second tag which indicates a source role corresponding to a sender of the second packet (operation 410). The system decapsulates the second packet to obtain an Ethernet header (operation 412), and obtains, from the Ethernet header, a second source MAC associated with the sender of the second packet (operation 414). The operation continues at Label B of FIG. 4B.

Figure 4B:
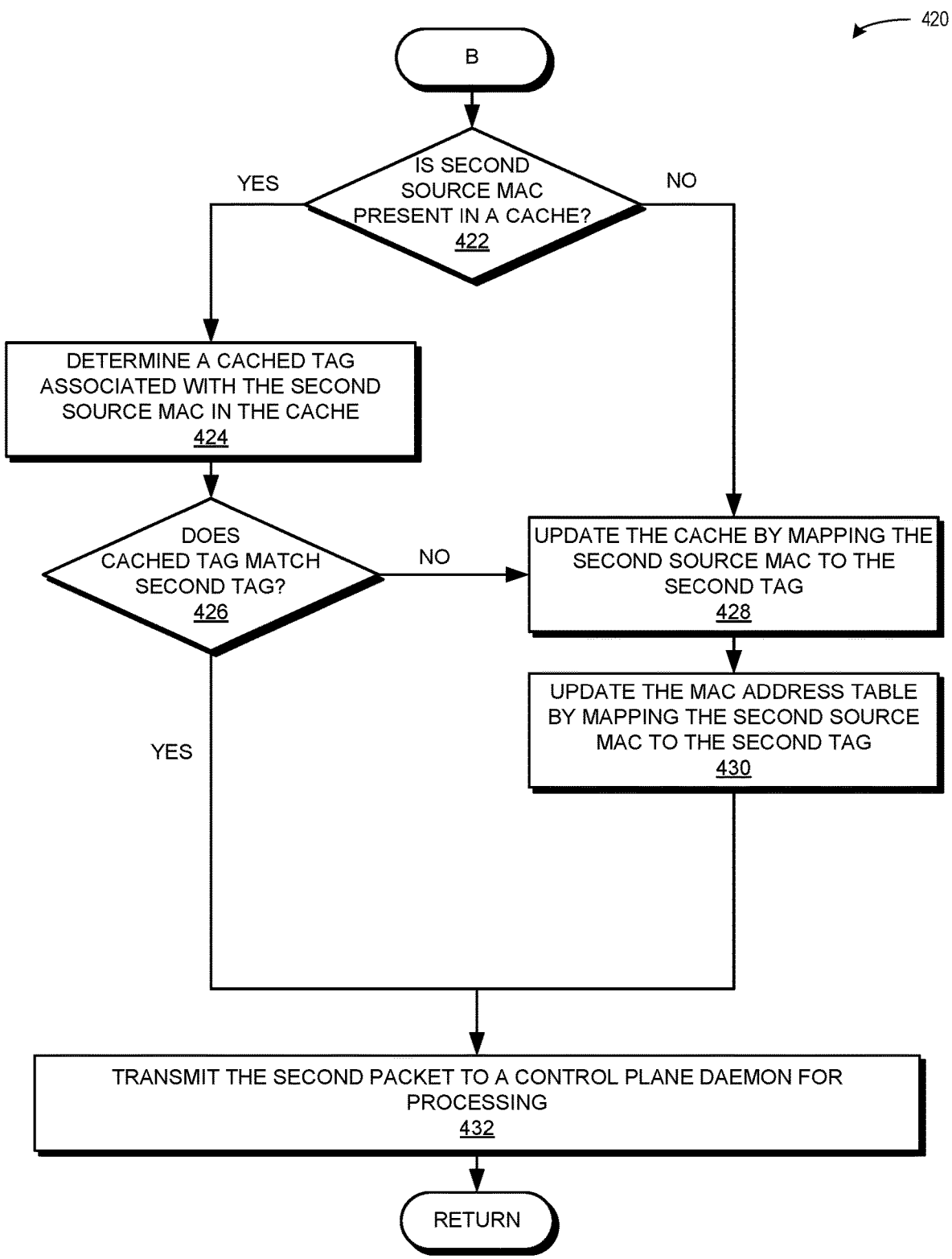
FIG. 4B presents a flowchart illustrating a method which facilitates handling of a CPU-reforwarded packet, in accordance with an aspect of the present application.

FIG. 4B presents a flowchart illustrating a method which facilitates handling of a CPU-reforwarded packet, in accordance with an aspect of the present application. If the system determines that the second source MAC is present in a cache (decision 422), the system determines a cached tag associated with the second source MAC in the cache (operation 424). If the cached tag matches the second tag (decision 426), the system transmits the second packet to a control plane daemon for processing (operation 432), and the operation returns. If the cached tag does not match the second tag (decision 426), the operation continues at operation 428.

If the system determines that the second source MAC is not present in the cache (decision 422) the system updates the cache by mapping the second source MAC to the second tag (operation 428), and updates the MAC address table by mapping the second source MAC to the second tag (operation 430). The system transmits the second packet to a control plane daemon for processing (operation 432), and the operation returns.

The methods depicted in FIGS. 3, 4A, and 4B may not involve packets which are stolen over the access ports. Because the source of packets which ingress over the access ports is generally a locally attached client, the MAC address table may already include the source role information for the locally attached client, and thus the challenge of losing tags does not exist for such packets. That is, no additional handling may be needed for such packets.

In addition, the described aspects may require packets (for both the CPU-generated packets and the CPU-reforwarded packets) to enter the ingress ASIC pipelines in order to perform the source MAC address lookup. In this manner, the described aspects can leverage the efficient lookup and packet encapsulation done by the ASIC without any intervention from the control plane. However, the described aspects may not work in cases where the CPU generates or transmits a packet with special metadata encoding which bypasses either the ingress pipeline or the source MAC lookup.

Computer System and Apparatus

Figure 5:
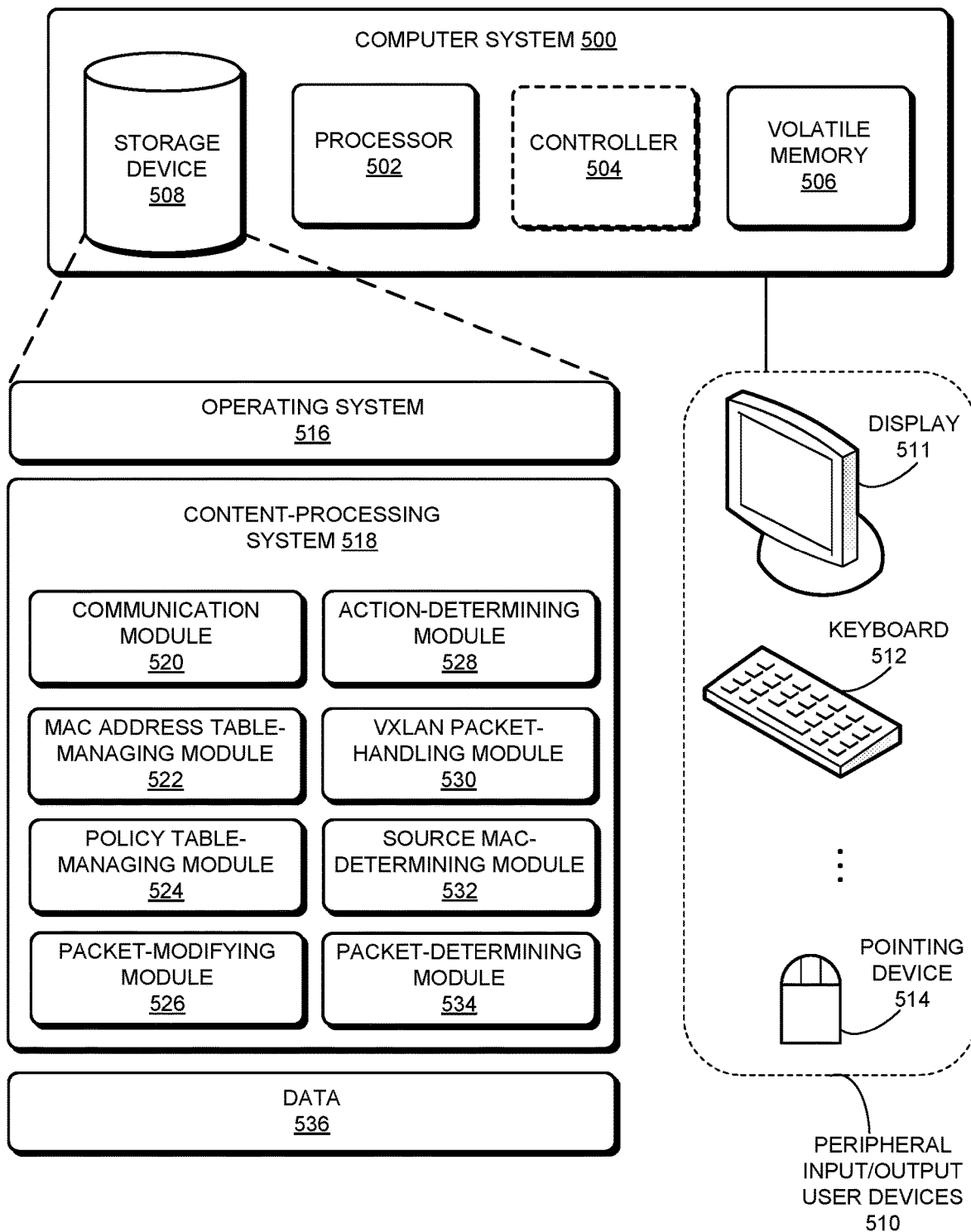
FIG. 5 illustrates a computer system which facilitates policy enforcement for CPU-generated packets and CPU-reforwarded packets, in accordance with an aspect of the present application.

FIG. 5 illustrates a computer system which facilitates policy enforcement for CPU-generated packets and CPU-reforwarded packets, in accordance with an aspect of the present application. Computer system 500 includes a processor 502, a volatile memory 506, and a storage device 508. In some aspects, computer system 500 can include a controller 504 (indicated by the dashed lines). Volatile memory 506 can include, e.g., random access memory (RAM), that serves as a managed memory, and can be used to store one or more memory pools. Storage device 508 can include persistent storage which can be managed or accessed via processor 502 (or controller 504). Furthermore, computer system 500 can be coupled to peripheral input/output (I/O) user devices 510, e.g., a display device 511, a keyboard 512, and a pointing device 514. Storage device 508 can store an operating system 516, a content-processing system 518, and data 536.

Content-processing system 518 can include instructions, which when executed by computer system 500, can cause computer system 500 or processor 502 to perform methods and/or processes described in this disclosure. Specifically, content-processing system 518 can include instructions for receiving and transmitting data packets, requests, and responses (communication module 520).

Content-processing system 518 can further include instructions for determining a first source media access control address (MAC) associated with a switch (source MAC-determining module 532). Content-processing system 518 can include instructions for updating a MAC address table by mapping the first source MAC to a first tag which indicates a source role corresponding to a network infrastructure associated with the switch (MAC address table-managing module 522). Content-processing system 518 can include instructions for generating, by a processor associated with the switch, a first packet which indicates the first source MAC (packet-determining module 534). Content-processing system 518 can include instructions for performing a first search in the MAC address table based on the indicated first source MAC to obtain the first tag (MAC address table-managing module 522). Content-processing system 518 can also include instructions for performing a second search in a policy table based on the first tag for a group-based policy which indicates an action to be applied to the first packet (policy table-managing module 524). Content-processing system 518 can include instructions for, responsive to determining that the second search is not successful (policy table-managing module 524), modifying a header of the first packet by adding the first tag to the header (packet-modifying module 526). Content-processing system 518 can include instructions for, responsive to determining that the second search is successful (policy table-managing module 524), determining that the indicated action to be applied comprises allowing the first packet (action-determining module 528). Content-processing system 518 can include instructions for transmitting the first packet (communication module 520).

Content-processing system 518 can additionally include instructions for determining a second packet to be inspected by the processor (packet-determining module 534). Content-processing system 518 can include instructions for receiving, by the processor, the second packet (communication module 520). Content-processing system 518 can include instructions for determining that the second packet is received over a VXLAN (VXLAN packet-handling module 530). Content-processing system 518 can include instructions for retrieving, from a header of the second packet, a second tag which indicates a source role corresponding to a sender of the second packet (VXLAN packet-handling module 530). Content-processing system 518 can include instructions for decapsulating the second packet to obtain an Ethernet header (VXLAN packet-handling module 530). Content-processing system 518 can also include instructions for obtaining, from the Ethernet header, a second source MAC associated with the sender of the second packet (source MAC-determining module 532). Content-processing system 518 can further include instructions for, responsive to determining that the second source MAC is present in a cache (source MAC-determining module 532): determining a cached tag associated with the second source MAC in the cache (source MAC-determining module 532); determining that the cached tag does not match the second tag (source MAC-determining module 532); updating the cache by mapping the second source MAC to the second tag (source MAC-determining module 532); updating the MAC address table by mapping the second source MAC to the second tag (MAC address table-managing module 522); and transmitting the second packet to a control plane daemon for processing (communication module 520).

Data 536 can include any data that is required as input or generated as output by the methods and/or processes described in this disclosure. Specifically, data 536 can store at least: a source MAC; a table; a MAC address table; a source MAC address table; a destination MAC; a destination MAC address table; a source role; a destination role; an indicator of a network infrastructure associated with a switch; an identifier of a switch; a packet; a decapsulated or encapsulated packet; a tag; a security tag; a policy; a policy table; a group-based policy (GBP); a GBP table; a group policy object (GPO); a GPO tag; a GPO encapsulation; an indicator of whether a search is successful; an action; an action which indicates whether to allow or deny a packet; a header; a VXLAN header; a VXLAN encapsulation or decapsulation; an Ethernet header; a cache; a cached tag; an indicator of whether a cached tag matches another tag; an identifier or indicator of a control plane daemon; an indicator or identifier of an ASIC associated with a switch; a result of a host lookup; a packet signature; a system MAC; and a virtual MAC.

Figure 6:
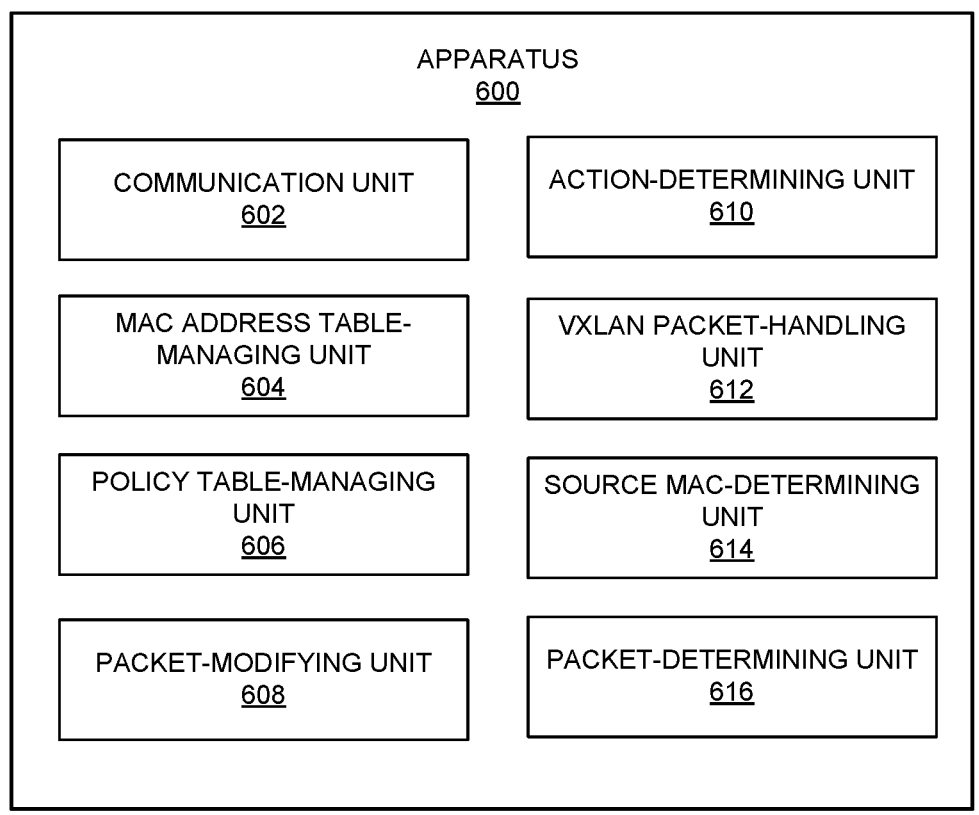
FIG. 6 illustrates an apparatus which facilitates policy enforcement for CPU-generated and CPU-reforwarded packets, in accordance with an aspect of the present application.

FIG. 6 illustrates an apparatus 600 which facilitates policy enforcement for CPU-generated and CPU-reforwarded packets, in accordance with an aspect of the present application. Apparatus 600 can comprise a plurality of units or apparatuses which may communicate with one another via a wired, wireless, quantum light, or electrical communication channel. Apparatus 600 may be realized using one or more integrated circuits, and may include fewer or more units or apparatuses than those shown in FIG. 6. Furthermore, apparatus 600 may be integrated in a computer system, or realized as a separate device or devices capable of communicating with other computer systems and/or devices.

Apparatus 600 may also include a non-volatile storage system or a memory management unit. Apparatus 600 may also be a switch which includes communication ports via which packets are received by a packet processor of the switch and further processed via switch hardware and modules or units 602-616. Apparatus 600 can comprise modules or units 602-616 which are configured to perform functions or operations similar to modules 520-534 of computer system 500 of FIG. 5, including: a communication unit 602; a MAC address table-managing unit 604; a policy table-managing unit 606; a packet-modifying unit 608; an action-determining unit 610; a VXLAN packet-handling unit 612; a source MAC-determining unit 614; and a packet-determining unit 616.

In general, the disclosed aspects provide a system which facilitates policy enforcement for CPU-generated and CPU-reforwarded packets. In one aspect of the present application, the system determines a first source media access control address (MAC) associated with a switch. The system updates a MAC address table by mapping the first source MAC to a first tag which indicates a source role corresponding to a network infrastructure associated with the switch. The system generates, by a processor associated with the switch, a first packet which indicates the first source MAC. The system performs a first search in the MAC address table based on the indicated first source MAC to obtain the first tag. The system performs a second search in a policy table based on the first tag for a group-based policy which indicates an action to be applied to the first packet. Responsive to determining that the second search is not successful, the system modifies a header of the first packet by adding the first tag to the header. Responsive to determining that the second search is successful, the system determines that the indicated action to be applied comprises allowing the first packet. The system transmits the first packet.

In a variation on this aspect, responsive to determining that the second search is successful: the system determines that the indicated action to be applied comprises dropping the first packet; and the system refrains from transmitting the first packet.

In a further variation on this aspect, the system determines a second packet to be inspected by the processor. The system receives, by the processor, the second packet. The system determines that the second packet is received over a VXLAN, and retrieves, from a header of the second packet, a second tag which indicates a source role corresponding to a sender of the second packet. The system decapsulates the second packet to obtain an Ethernet header, and obtains, from the Ethernet header, a second source MAC associated with the sender of the second packet. Responsive to determining that the second source MAC is present in a cache, the system: determines a cached tag associated with the second source MAC in the cache; determines that the cached tag does not match the second tag; updates the cache by mapping the second source MAC to the second tag; updates the MAC address table by mapping the second source MAC to the second tag; and transmits the second packet to a control plane daemon for processing.

In a further variation, responsive to determining that the cached tag does match the second tag, the system transmits the second packet to the control plane daemon for processing.

In a further variation, responsive to determining that the second source MAC is not present in the cache, the system: updates the cache by mapping the second source MAC to the second tag; updates the MAC address table by mapping the second source MAC to the second tag; and transmits the second packet to the control plane daemon for processing.

In a further variation, the cache is associated with the processor, and the MAC address table is stored in an ASIC associated with the switch.

In a further variation, the system receives, via an ingress pipeline, a third packet associated with a third source MAC. The system performs a third search in the MAC address table based on the third source MAC to obtain a third tag which indicates a source role, wherein the third tag comprises at least one of the first tag and the second tag. The system determines a destination role associated with the third packet by performing a search based on at least one of the MAC address table and a host lookup. The system performs a fourth search in the policy table, based on the source role, the destination role, and a signature of the third packet, for a group-based policy which indicates an action to be applied to the third packet.

In a further variation, the first source MAC associated with the switch comprises at least one of: a system MAC of the switch; and a virtual MAC associated with the switch.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware devices or apparatus. For example, the hardware devices or apparatus can include, but are not limited to, application-specific integrated circuit (ASIC) chips, field-programmable gate arrays (FPGAs), dedicated or shared processors that execute a particular software program or a piece of code at a particular time, and other programmable-logic devices now known or later developed. When the hardware devices or apparatus are activated, the hardware modules perform the methods and processes included within them.

The foregoing descriptions of aspects have been presented for purposes of illustration and description only. They are not intended to be exhaustive or to limit the aspects described herein to the forms disclosed. Accordingly, many modifications and variations will be apparent to practitioners skilled in the art. Additionally, the above disclosure is not intended to limit the aspects described herein. The scope of the aspects described herein is defined by the appended claims.

What is claimed is:

1. A computer-implemented method, comprising:
   determining a first source media access control address (MAC) associated with a switch;
   updating a MAC address table by mapping the first source MAC to a first tag which indicates a source role corresponding to a network infrastructure associated with the switch;
   generating, by a processor associated with the switch, a first packet which indicates the first source MAC;
   performing a first search in the MAC address table based on the indicated first source MAC to obtain the first tag;
   performing a second search in a policy table based on the first tag for a group-based policy which indicates an action to be applied to the first packet;

responsive to determining that the second search is not successful, modifying a header of the first packet by adding the first tag to the header;
responsive to determining that the second search is successful, determining that the indicated action to be applied comprises allowing the first packet;
transmitting the first packet;
determining a second packet to be inspected by the processor;
receiving, by the processor, the second packet;
determining that the second packet is received over a virtual extensible local area network (VXLAN);
retrieving, from a header of the second packet, a second tag which indicates a source role corresponding to a sender of the second packet;
decapsulating the second packet to obtain an Ethernet header;
obtaining, from the Ethernet header, a second source MAC associated with the sender of the second packet; and
responsive to determining that the second source MAC is present in a cache:
 determining a cached tag associated with the second source MAC in the cache;
 determining that the cached tag does not match the second tag;
 updating the cache by mapping the second source MAC to the second tag;
 updating the MAC address table by mapping the second source MAC to the second tag; and
 transmitting the second packet to a control plane daemon for processing.

2. The method of claim 1, further comprising:
responsive to determining that the second search is successful:
 determining that the indicated action to be applied comprises dropping the first packet; and
 refraining from transmitting the first packet.

3. The method of claim 1, further comprising:
responsive to determining that the cached tag does match the second tag, transmitting the second packet to the control plane daemon for processing.

4. The method of claim 1, further comprising:
responsive to determining that the second source MAC is not present in the cache:
updating the cache by mapping the second source MAC to the second tag;
updating the MAC address table by mapping the second source MAC to the second tag; and
transmitting the second packet to the control plane daemon for processing.

5. The method of claim 1,
wherein the cache is associated with the processor, and
wherein the MAC address table is stored in an application specific integrated circuit (ASIC) associated with the switch.

6. The method of claim 1, further comprising:
receiving, via an ingress pipeline, a third packet associated with a third source MAC;
performing a third search in the MAC address table based on the third source MAC to obtain a third tag which indicates a source role, wherein the third tag comprises at least one of the first tag and the second tag;
determining a destination role associated with the third packet by performing a search based on at least one of the MAC address table and a host lookup; and
performing a fourth search in the policy table, based on the source role, the destination role, and a signature of the third packet, for a group-based policy which indicates an action to be applied to the third packet.

7. The method of claim 1, wherein the first source MAC associated with the switch comprises at least one of:
a system MAC of the switch; and
a virtual MAC associated with the switch.

8. A computer system, comprising:
a processor; and
a memory coupled to the processor and storing instructions which, when executed by the processor, cause the processor to perform a method, the method comprising:
 determining a first source media access control address (MAC) associated with a switch;
 updating a MAC address table by mapping the first source MAC to a first tag which indicates a source role corresponding to a network infrastructure associated with the switch;
 generating, by a processor associated with the switch, a first packet which indicates the first source MAC;
 performing a first search in the MAC address table based on the indicated first source MAC to obtain the first tag;
 performing a second search in a policy table based on the first tag for a group-based policy which indicates an action to be applied to the first packet;
 responsive to determining that the second search is not successful, modifying a header of the first packet by adding the first tag to the header;
 responsive to determining that the second search is successful, determining that the indicated action to be applied comprises allowing the first packet;
 transmitting the first packet;
 determining a second packet to be inspected by the processor;
 receiving, by the processor, the second packet;
 determining that the second packet is received over a virtual extensible local area network (VXLAN);
 retrieving, from a header of the second packet, a second tag which indicates a source role corresponding to a sender of the second packet;
 decapsulating the second packet to obtain an Ethernet header;
 obtaining, from the Ethernet header, a second source MAC associated with the sender of the second packet; and
 responsive to determining that the second source MAC is present in a cache:
  determining a cached tag associated with the second source MAC in the cache;
  determining that the cached tag does not match the second tag;
  updating the cache by mapping the second source MAC to the second tag;
  updating the MAC address table by mapping the second source MAC to the second tag; and
  transmitting the second packet to a control plane daemon for processing.

9. The computer system of claim 8, wherein the method further comprises:
responsive to determining that the second search is successful:
 determining that the indicated action to be applied comprises dropping the first packet; and
 refraining from transmitting the first packet.

10. The computer system of claim 8, wherein the method further comprises:
  responsive to determining that the cached tag does match the second tag, transmitting the second packet to the control plane daemon for processing.

11. The computer system of claim 8, wherein the method further comprises:
  responsive to determining that the second source MAC is not present in the cache:
    updating the cache by mapping the second source MAC to the second tag;
    updating the MAC address table by mapping the second source MAC to the second tag; and
    transmitting the second packet to the control plane daemon for processing.

12. The computer system of claim 8,
  wherein the cache is associated with the processor, and
  wherein the MAC address table is stored in an application specific integrated circuit (ASIC) associated with the switch.

13. The computer system of claim 8, wherein the method further comprises:
  receiving, via an ingress pipeline, a third packet associated with a third source MAC;
  performing a third search in the MAC address table based on the third source MAC to obtain a third tag which indicates a source role, wherein the third tag comprises at least one of the first tag and the second tag;
  determining a destination role associated with the third packet by performing a search based on at least one of the MAC address table and a host lookup; and
  performing a fourth search in the policy table, based on the source role, the destination role, and a signature of the third packet, for a group-based policy which indicates an action to be applied to the third packet.

14. The computer system of claim 8, wherein the first source MAC associated with the switch comprises at least one of:
  a system MAC of the switch; and
  a virtual MAC associated with the switch.

15. A non-transitory computer-readable storage medium storing instructions that when executed by a computer processor cause the computer processor to perform a method, the method comprising:
  determining a first source media access control address (MAC) associated with a switch;
  updating a MAC address table by mapping the first source MAC to a first tag which indicates a source role corresponding to a network infrastructure associated with the switch;
  generating, by a processor associated with the switch, a first packet which indicates the first source MAC;
  performing a first search in the MAC address table based on the indicated first source MAC to obtain the first tag;
  performing a second search in a policy table based on the first tag for a group-based policy which indicates an action to be applied to the first packet;
  responsive to determining that the second search is not successful, modifying a header of the first packet by adding the first tag to the header;
  responsive to determining that the second search is successful, determining that the indicated action to be applied comprises allowing the first packet;
  transmitting the first packet;
  determining a second packet to be inspected by the processor;
  receiving, by the processor, the second packet;
  determining that the second packet is received over a virtual extensible local area network (VXLAN);
  retrieving, from a header of the second packet, a second tag which indicates a source role corresponding to a sender of the second packet;
  decapsulating the second packet to obtain an Ethernet header;
  obtaining, from the Ethernet header, a second source MAC associated with the sender of the second packet; and
  responsive to determining that the second source MAC is present in a cache:
    determining a cached tag associated with the second source MAC in the cache;
    determining that the cached tag does not match the second tag;
    updating the cache by mapping the second source MAC to the second tag;
    updating the MAC address table by mapping the second source MAC to the second tag; and
    transmitting the second packet to a control plane daemon for processing.

16. The non-transitory computer-readable storage medium of claim 15, wherein the method further comprises:
  responsive to determining that the second source MAC is not present in the cache:
    updating the cache by mapping the second source MAC to the second tag;
    updating the MAC address table by mapping the second source MAC to the second tag; and
    transmitting the second packet to the control plane daemon for processing.

17. The non-transitory computer-readable storage medium of claim 15, wherein the method further comprises:
  receiving, via an ingress pipeline, a third packet associated with a third source MAC;
  performing a third search in the MAC address table based on the third source MAC to obtain a third tag which indicates a source role, wherein the third tag comprises at least one of the first tag and the second tag;
  determining a destination role associated with the third packet by performing a search based on at least one of the MAC address table and a host lookup; and
  performing a fourth search in the policy table, based on the source role, the destination role, and a signature of the third packet, for a group-based policy which indicates an action to be applied to the third packet.

\* \* \* \* \*